No. 680,375. Patented Aug. 13, 1901.
J. W. FAWKES, Sr.
FRUIT GRADER, CUTTER, AND PITTER.
(Application filed May 28, 1900.)
(No Model.) 4 Sheets—Sheet 1.
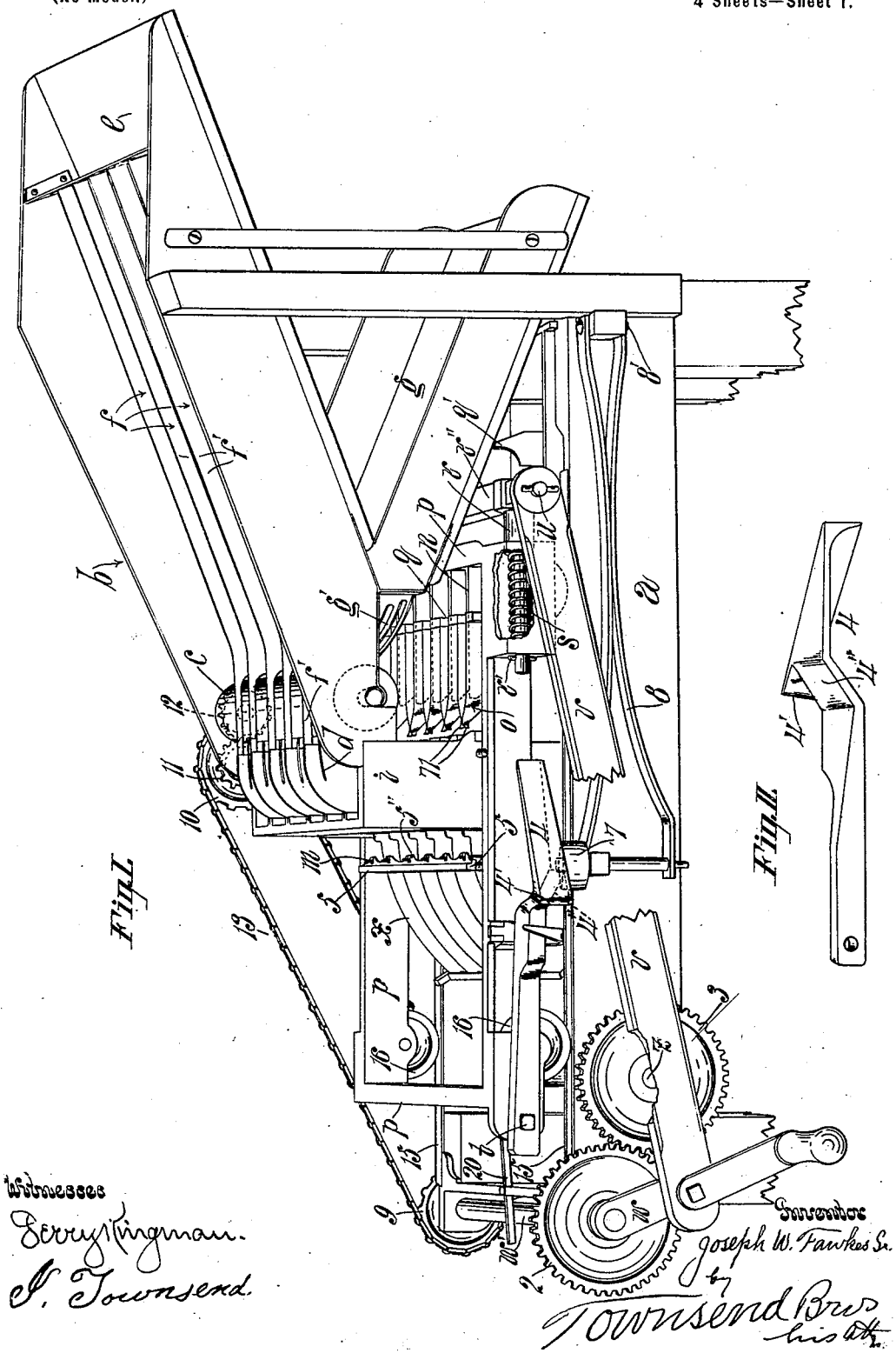

No. 680,375. Patented Aug. 13, 1901.
J. W. FAWKES, Sr.
FRUIT GRADER, CUTTER, AND PITTER.
(Application filed May 28, 1900.)
(No Model.) 4 Sheets—Sheet 2.
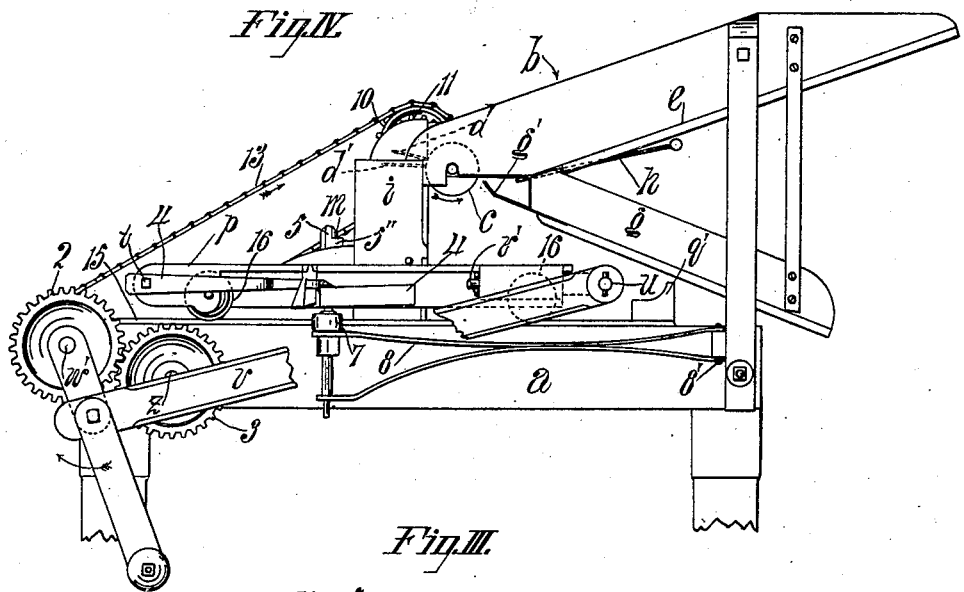

No. 680,375. Patented Aug. 13, 1901.
J. W. FAWKES, Sr.
FRUIT GRADER, CUTTER, AND PITTER.
(Application filed May 28, 1900.)
(No Model.) 4 Sheets—Sheet 3.
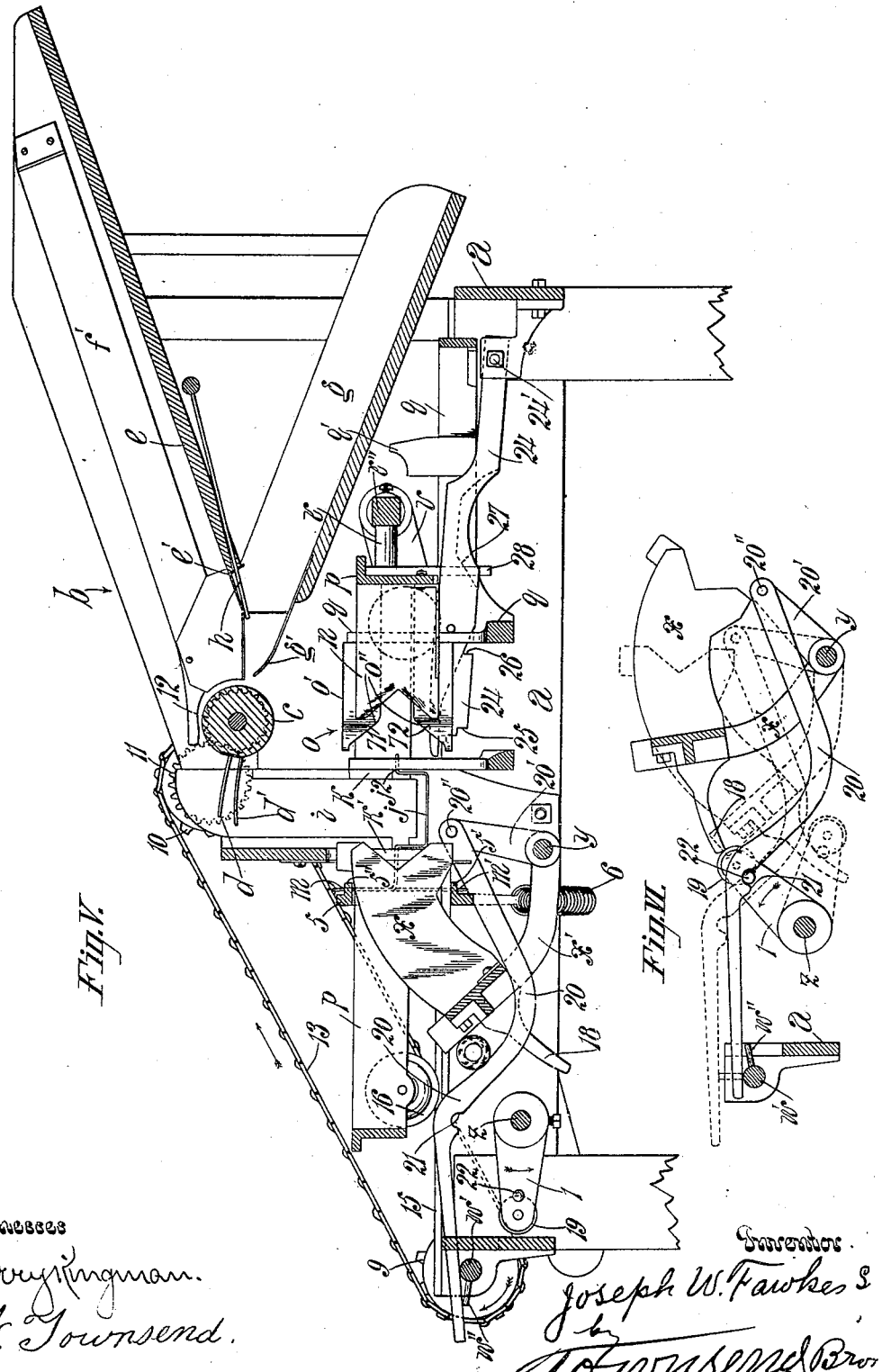

No. 680,375. Patented Aug. 13, 1901.
J. W. FAWKES, Sr.
FRUIT GRADER, CUTTER, AND PITTER.
(Application filed May 28, 1900.)
(No Model.) 4 Sheets—Sheet 4.
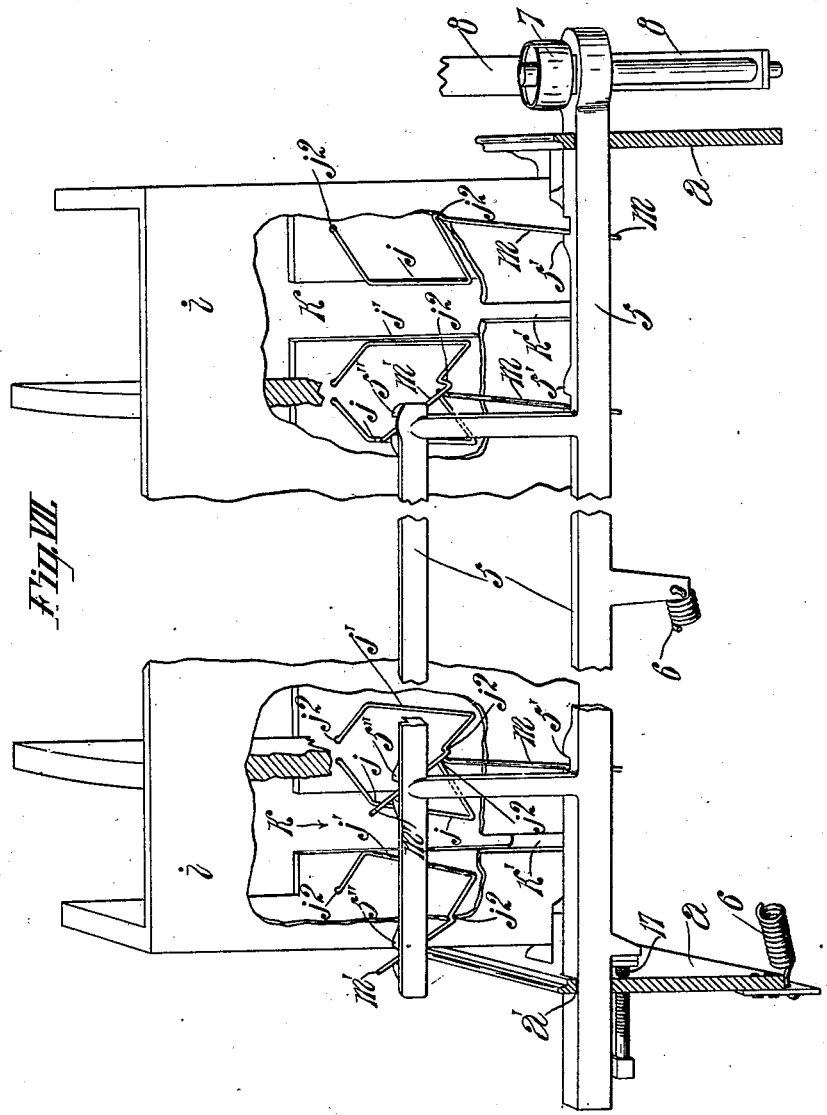

UNITED STATES PATENT OFFICE.

JOSEPH W. FAWKES, SR., OF BURBANK, CALIFORNIA.

FRUIT GRADER, CUTTER, AND PITTER.

SPECIFICATION forming part of Letters Patent No. 680,375, dated August 13, 1901.

Application filed May 28, 1900. Serial No. 18,317. (No model.)

*To all whom it may concern:*

Be it known that I, JOSEPH W. FAWKES, Sr., a citizen of the United States, residing at Burbank, in the county of Los Angeles and State of California, have invented a new and useful Combined Fruit Grader, Cutter, and Pitter, of which the following is a specification.

My invention relates to a machine of the class of machines designed to remove the pits from freestone fruits, such as apricots, peaches, and the like.

An object of my invention is to remove the pits without mashing or defacing the pulp of the fruit. By this invention the pulp is cut smoothly into halves and is expanded away from the pit, and the pit is then removed from the pulp and discharged from the machine separately from the pulp, and the pieces of pulp are then discharged from the machine.

An object of my invention is to perform this work with great rapidity, and my machine is capable of being made of any desired capacity by simply duplicating the parts which operate upon the fruit and placing them side by side and simultaneously operating them by a single power-applying device.
In order to feed the several devices for simultaneously operating upon the several fruits, it becomes necessary that the fruits shall be of an approximately uniform size; and an object of my invention is to so construct the machine that it will discard from the fruit fed into the machine all undersized fruit, feeding to the fruit-holder only those fruits which are of the appropriate size to be operated upon by the machine.
Another object of my invention is to make the machine adjustable, so that it may be adjusted to cut and pit fruits of different sizes, so that after the fruits of one size have been selected and cut and pitted the machine may be adjusted to operate upon the fruits which have been discarded at the first running of the machine, and the discarded fruits may then be run through the machine and properly cut and pitted. By this means the cut and pitted fruits will be assorted, thereby adding to the attractiveness of their appearance and enabling them to be evenly treated in any of the processes of curing or preserving.

My newly-invented machine comprises a fruit-holder, a knife to split the fruit, an expander to follow behind the edge of the knife to expand the split fruit, and means for operating the knife and expander. The expander preferably comprises an upper pair and a lower pair of superposed pulp-expanding blades, the blades of each pair being arranged on opposite sides of the path of the knife which is to first split the fruit and diverging rearwardly and the edges of the superposed expander-blades diverging forwardly in a V shape; but the pairs of blades are separated from each other sufficiently to allow the pit to pass between the pair of blades. The expander is arranged to follow the cutting edge of the knife, and its edges enter the split in the pulp made by the knife on the advance movement and spread the pulps apart and receive the pit in the space between the blades. I also provide a knife to play in the path of the first splitting-knife to split the fruit on the opposite side. Both of these blades are provided with V-shape edges to chamber the pit. Means are provided for reciprocating both knives appropriately, and the two knives are returned while the expander remains stationary, by which means the pit is pushed back and withdrawn from the pulp, which is held by the expander.

The accompanying drawings illustrate a machine of a convenient size; but it is to be understood that the machine may be constituted of devices for operating upon only one fruit at a time or may be extended within any practicable limits.

Figure I is a perspective view of a machine embodying my invention and arranged to operate simultaneously upon six fruits. Fig. II is a view of the under side of the fruit-dropping-gate-operating dog. Fig. III is a plan of the machine with parts broken away to expose parts that would otherwise be hidden. Fig. IV is a side elevation of the same. Fig. V is a sectional elevation on line V V, Fig. III. Fig. VI is a detail elevation showing the knife-operating mechanism. Fig. VII is a fragmental perspective front view of the fruit-chute gates and the means for operating them.

*a* indicates the frame of the machine.

*b* in a general way indicates the grader, and *c* the feed-roller, provided with feed-fingers *d d'*.

*e* indicates the floor of the grader, which slopes forward and downward.

*f* indicates a grader-way having walls *f'*, arranged at a distance apart to allow the fruit of the largest size which is to be operated on by the machine to run down said way.

*e'* indicates extensions of the floor of the grader, at the lower edge thereof, between which extensions *e'* are notches *f''*, through which the smaller fruit may fall into a chute *g*, which slopes downward and rearward from beneath said notches or openings to carry away the smaller fruit.

*g'* indicates fingers extending upwardly from the upper edge of the chute *g* to project beneath the notches *f''* to catch the fruit that falls through said notches and to direct it onto the downwardly and rearwardly sloping small-fruit chute *g*.

*h* indicates the gate for closing the notches *f''* in order to adapt the same for feeding the small fruit to the feed-roller.

The feed-roller *c* is arranged to cross the end of the way *f* to intercept the fruit which passes down the way, and means are provided for rotating the roller upward, over, and forward to cause the fingers to come up through their respective notches and catch the fruit and carry it over the roller.

The machine is furnished in front of the roller with a fruit-holder to receive the fruit from the fingers *d* and hold it during the operation of cutting and pitting. This fruit-holder consists in a vertical chute, hopper, or pocket *i* and fruit-holding gates *j j'*, pivoted at the opposite sides of the chute to intermittently close the lower end of the chute to catch the fruit and sustain it in the position to be acted upon by the cutting and pitting devices.

*k* indicates an opening in the rear wall of the chute, and *k'* indicates an opening in the front wall of the chute. The rear opening *k* is to admit the rear splitting-knife and the pulp-expander, and the front opening *k'* is to admit the front splitting-knife.

*m m'* indicate arms for the gates *j j'*, respectively. Suitable mechanism is provided for simultaneously operating the arms to cause the gates to close the lower end of the chute and for opening said chute as occasion requires in the operation of the machine.

*n* indicates the rear or initial splitting-knife.

*o* in a general way indicates the expander, which moves synchronously with the knife throughout a greater portion of the movement of the same; but the device is arranged to allow the expander to remain stationary at the beginning of the stroke of the knife in either direction, so as to allow the edge of the expander to follow the edge of the knife in both its forward and backward movement.

*p* indicates the initial-knife carrier. This carrier in the usual construction of the machine will be in the form of a frame which extends entirely around the chute or chutes of the fruit-holder, and the initial splitting knife or knives *n* are fastened to and project forward from the rear bar of such frame to play through the rear opening *k* of the chute.

*q* indicates the expander-carrier in front of the rear bar of the initial-knife carrier.

Suitable means are provided for throwing the knife-carrier forward and back. *r* indicates a shouldered plunger for this purpose arranged to have a limited play forward and back in the knife-carrier to move the knife-carrier forward and back.

*s* indicates a spring carried by the knife-carrier and against the rear end of which the shoulder of the plunger presses to yieldingly throw the knife forward. The plunger constitutes a practical portion of the knife-carrier. *r'* indicates a pin to prevent the withdrawal of the plunger from the main body *p* of such carrier. Two plungers *r*, with a spring *s* for each, are shown, one on each side of the machine and connected together by a bar *r''* to operate simultaneously on the opposite sides of the carrier frame or body *p*.

*q'* indicates a stop on the expander-carrier, which extends into the path of the knife-carrier, at the rear thereof, to be thrown backward at the latter part of the movement of the knife-carrier. The knife-carrier has a greater movement forward and back than the expander-carrier and engages to throw the expander-carrier forward at the close of the forward movement of the knife-carrier and to throw the expander-carrier back at the close of the rearward movement of the knife-carrier.

*u* indicates a wrist-pin on the plunger of the knife-carrier, *v* a pitman connected with said wrist-pin, and *w* a crank connected with the pitman to operate the same to reciprocate the plunger, and thereby reciprocate the knife-carrier.

*x* indicates a pivoted knife the pivot *y* of which is below the level of the bottom of the chute. Said knife is connected with the pivot by an arm *x'*, which extends forward from the pivot and from which the body of the knife projects upward and rearward in the arc of a circle to bring its edge upright in front of the opening *k'* in the pocket *i*. Means are provided for throwing the pivoted knife into and withdrawing it from the pocket or chute *i* through the front opening *k'* thereof. Preferably the arm *x'* is sufficiently weighted and is so located with relation to the fruit-holder chute, the edge of the knife, and the weighted portion of the arm that the pivot will be between a vertical line drawn from the inner limit of the path of the edge of the knife and the inner limit of the path of the center of gravity of the knife and arm, so that when the knife is at the inner limit of its stroke the force of gravity will tend to withdraw the knife from the chute.

$z$ indicates a cam-shaft operatively connected with the crank $w$ to rotate relative to the movement of the knife-carrier—that is to say, the connections are such that the rotation of the cam-shaft bears a relation to the movement of the knife-carrier.

1 indicates a cam on the cam-shaft, arranged to intermittently throw the pivoted knife into the chute of the fruit-holder.

2 indicates a crank-shaft cog-wheel, and 3 indicates the cam-shaft cog-wheel of the same radius therewith on the cam-shaft $z$.

4 indicates a dog pivoted to the knife-carrier by a pivot $t$.

5 indicates a bar arranged to slide at right angles to the axes $j^2$ of the fruit-holding gates $j\ j'$ to operate the arms $m\ m'$ of such gates. The arm $m$ of the gate $j$ projects downward to swing in an arc below the level of the axis of said gate, and the arm $m'$ of the gate $j'$ projects up to swing in an arc above the level of the axis of said gate. The said gates are arranged to swing in arcs, respectively, which extend from near the horizontal to a vertical, so that when the gates are swung toward each other they will approach the horizontal position to practically close the bottom of the fruit-holder chute to retain a fruit, and when swung downward to approach a vertical position they will open the chute. By arranging the arms $m$ and $m'$ to project in opposite directions, upward and downward, from the axes of the gate-pivots the simultaneous movement of the free ends of the arms toward one side of the machine will move the free margins of the gates toward each other to cause them to close the chute, while a like movement in the reverse direction will move the gates from each other to open the chute.

The bar 5 is provided with lower and upper bearings 5' and 5'', respectively, for the downwardly and upwardly projecting arms $m\ m'$ of the gates, so that the endwise movement of the bar in one direction will throw the gate-arms simultaneously to close the gates and a reverse movement of the bar will throw the arms simultaneously to open the gates.

6 indicates a spring for throwing the arm-throwing bar to close the gates and normally hold them closed.

7 indicates a lug on the arm-throwing bar 5 to be operated by the pivoted dog 4. Said pivoted dog extends rearward from its pivot $t$ and is wedge-shaped at its free end, its outer side diverging from the frame in the direction of the pivot. The thin edge of the wedge-shaped dog 4 is arranged to enter between the lug 7 and the frame of the machine to throw the arm-throwing bar to open the gates. The wedge terminates at a point 4', which will escape the lug 7 at the close of the rearward movement of the knife-carrier $p$. The front wide end of the wedge is beveled to form at its under side a face 4'', sloping downward toward the thin edge of the wedge, so that when the lug has escaped from the wedge and the bar 5 has been thrown by the bar-throwing spring 6 to close the gates the lug will be in position in the path of the beveled end face of the wedge, so that upon the forward movement of the knife-carrier the dog will be drawn forward over the lug until the thin edge of the wedge is reached, when the dog will fall from the lug into position to again throw the lug away from the frame of the machine at the next retraction of the knife-carrier. The lug 7 is preferably in the form of an antifriction-roller, as indicated in the drawings. The lug-carrying end of the arm-operating bar 5 is pivoted to a supporting-link 8, which is pivoted to the frame of the machine by a vertical pivot 8'.

$a'$ indicates a way in the frame for the opposite end of the arm-throwing bar 5.

9 indicates a sprocket-wheel on the crank-shaft $w'$.

10 is a pinion-driving sprocket-wheel, 11 a pinion on the sprocket-wheel 10, and 12 a cog-wheel meshing with said pinion and mounted on the end of the feed-roller $c$.

13 indicates a sprocket-chain connecting the sprocket-wheels 9 and 10. The sprocket-wheels are of one diameter and the pinion 11 and cog-wheel 12 are of one diameter, so that the feed-roller, the knives, and the gates will all be operated with definite relation to each other.

15 indicates rails on the frame $a$ for wheels 16, which carry the knife-carrier.

17 indicates an adjustable stop to determine the normal position of the gate-operating bar. It is to be observed from Fig. VII that the movement of the gates in the operation of closing the chute is upward toward the middle of the chute and that the inner margins of the gates are thus held at a greater or less distance from the level of the axes of the gates, depending upon the position at which the arms $m\ m'$ are held by the arm-throwing bar 5. In consequence of this the normal position of said margins of the gates will be determined by the normal position of the bar 5, which operates the gates. By allowing the bar to be thrown fully back to the left the edges or inner margins of the gates will be brought to their highest position—viz., level with the axes of the gates—but by screwing the stop-screw 17 in to stop the bar before it has reached this position the margins of the gates will be normally held below the level of the axes of the gates and the fruit resting thereon will be below the level at which it would be held if the stop-screw were screwed out.

In order that the normal position of the gates may accurately determine the depth to which the fruit will descend in the fruit-holding chute, I prefer to make the gates of a loop of wire, as shown in the drawings, and each of said gates, with its operating-arm, is made of a single piece of wire bent in a loop to form the gate and then bent at right angles with said loop on each of the sides thereof to form the axis for the gate and then bent at one end to form the gate-operating arm. By this arrangement the inner margins of the gates are practically the only part of the gates upon which the fruit rests when in the chute, and therefore the height of said margins determines the height of the fruit in the chute or pockets.

The arm $x'$ of the pivoted knife $x$ is provided with a tappet 18 to be engaged by the cam 1. Said cam is preferably provided with an antifriction-roller 19, and the tappet 18 is in the path of said antifriction-roller. The cam-shaft cog-wheel 3 lies between the crank-shaft cog-wheel 2 and the pivoted knife, and the cam 1 is arranged to move downward, rearward, under, and upward to engage the tappet to throw the pivoted knife upward and backward into the chute at the rear movement of the knife-carrier.

20 indicates a latch pivotally connected with the pivoted knife through an arm 20', which is rigidly fastened to said knife and projects upward and rearward from the pivot $y$ of said knife. The latch 20 is pivoted by pivot 20'' to the upper end of the arm 20' and is provided with a catch 21 to be caught by a lug 22 on the cam 1 after said cam escapes from the tappet 18, so that when the knife-arm is free to fall, thus to withdraw the pivoted knife from the fruit-holder chute, the lug on the cam will draw the latch forward to positively retract the knife from the fruit-holder chute in any instance in which the action of gravity alone does not cause the knife to be retracted.

The latch 20 normally rests upon a stop preferably formed by the shaft $w'$ and is thereby normally held in position to be caught by the upwardly and forwardly moving cam-lug 22 after the close of the rear movement of the pivoted knife. The latch 20 is pivoted to the upper end of said arm 20', so that the forward movement of the latch causes the arm to be thrown forward, thus to retract the knives from the fruit-holder chute.

$w''$ indicates an arm or pin projecting from the crank-shaft $w'$ to engage the latch 20 and lift it to carry the catch 21 out of the path of the lug 22 after the knife has been thrown by the operation just above described, thus to allow the cam-shaft to rotate freely.

24 indicates a latch for locking the fruit-expander $o$ in its forward and rearward positions, respectively. Said latch is pivoted by a pivot 24' to the rear of the frame $a$ and projects forward and is provided with front and back catches 25 and 26 to intercept the expander-carrier at the front and rear limits of the movement of said expander-carrier. The latch 24 is furnished with a projection or lug 27, which extends in the path of a latch-throwing shoulder 28, which is carried by and moves forward and back with the knife-carrier. The projection 27 is beveled at front and rear, so that the shoulder 28 will readily lift the latch and hold it lifted at a portion of the forward and at a portion of the rearward movement of the knife-carrier. The projection extends down far enough into the path of the shoulder so that the latch will be lifted by the shoulder from contact with the expander-carrier, so that at the intermediate movement of the knife-carrier the expander-carrier will be free, thus allowing the expander-carrier to be moved by the knife-carrier. The front catch 25 of the latch is arranged to prevent the retraction of the pulp-expander carrier, but does not interfere with the advance of the pulp-expander carrier, and the rear catch is arranged to prevent the advance of the pulp-expander carrier, but does not interfere with the retraction of such carrier. Consequently in the practical operation of the machine the pulp-expander is free to be moved back to the fullest extent by the final rearward movement of the knife-carrier and is also free to be moved forward to the fullest extent at the forward limit of the movement of the knife-carrier; but the front catch 25 of the latch comes into catching position when the expander has made its full forward stroke and holds the expander in position to hold the fruit until the initial cutting-blade $n$ passes back from the fruit. When the blade $n$ is fully retracted, the rear catch 26 catches and prevents the knife-carrier from bringing the expander-carrier forward until the cut has been made for the expander to enter. Then the shoulder 28 lifts the latch and allows the expander to be moved forward by the knife-carrier.

In practical operation the fruits will be poured into the runways of the grader from the box from the orchard. The adjustable fingers $h$ at the lower end of the chute will be retracted to leave the notches $f''$ in the floor of the grader open, so that the smaller fruits will pass out at such notches. Then the crank will be turned, thus drawing forward upon the wrist-pin of the knife-carrier. At the same time the sprocket chain and wheels and the pinion and cog-wheel driven thereby will rotate the roller, thus carrying the fingers $d$ $d'$ up through the notches to catch the fruit which is resting against the roller at the lower end of the fruitway. The fruit will thus be carried up forward over the roller and will be deposited in the fruit-holder chute or pocket. The parts are so timed with relation to each other that at the movement of the fingers toward the chute the gates are in position to close the lower part of the chute, so that the fruit falls upon the gates and is thereby held in the path of the reciprocating splitting-knives. A further movement of the crank throws the initial splitting-knife forward until it has cut into the fruit and has chambered the pit in the angle of its V edge. At the close of the forward movement of the initial splitting-knife the expander-blades are thrown forward to enter the cleft made by the splitting-knife and expand the pulp. After the rear cut has been made the cam completes the operation of throwing the pivoted knife in at the front side of the chute, thereby splitting the front portion of the pulp in line with the split which has already been made at the rear of the pulp; but the insertion of the pivoted knife into the chute continues after the pitman has begun to throw the initial knife-carrier back. At the close of the forward movement of the knife-carrier it will have engaged the expander-carrier to throw the expander forward, as above stated, and when the expander has reached its forward limit the latch 24 will have fallen into position to hold the expander-carrier to prevent the retraction of the expander-carrier until the knife-carrier has risen far enough to bring its latch-operating shoulder 28 underneath the projection 27 of the latch, thereby raising the latch to free the expander-carrier, so that at the close of the rear movement of the knife-carrier the knife-carrier can throw the expander-carrier back, thus retracting the expander-carrier. In the meantime the fruit-pit has been clutched between the V edges of the initial and pivoted knives and has been carried rearward of the position which it occupied at the moment it was engaged by the pivoted knife. Then by the retraction of the two knives the pit is dropped, falling down between the lower expander-blades and out of the machine. At the close of the backward movement of the knife-carrier the dog 4 engages the lug on the gate-operating bar to throw the bar in opposition to the bar-holding spring 6, and thereby withdrawing the gates from across the chute and allowing the pulp to drop from the machine in a path different from that in which the pit has been dropped, thus separating the pit from the halves of the pulp.

The fruit-expander is composed of an upper pair of pulp-expanding blades 71 and a lower pair of pulp-expanding blades 72, the blades of each pair being arranged on opposite sides of and diverging rearwardly from the vertical plane of the path of the knife, and the edges of the superposed pulp-expanding blades diverge forwardly from a horizontal plane. The edges of the expander-blades are substantially parallel with the limbs of the V-shaped edge of the knife $n$. The main body $o'$ of each of the expander-blades, which is at the rear of the sloping edge $o''$ of the expander-blades, is in a plane parallel with the path of the knife. The blade-body is bent to form the foot $o'''$, which is removably secured to the expander-carrier $q$ by bolts $q''$. By this arrangement the expander-blades may be easily and cheaply replaced in case of breakage and the force for expanding the pulp is applied by the expander-blades to the cut edges of the pulp, and the pulp is thereby removed from the pit by a wedge-like action. Sufficient space is left between the bodies of the upper and lower pairs of expander-blades to accommodate the bulging mid-line of the pit. The main bodies $o'$ of the expander-blades of each pair are far enough apart to allow the pits to pass freely therebetween when they have passed the sloping edges of such blades, so that when the pit comes into the space between the main bodies $o'$ of the blades it will fall out of the machine.

After all the fruit has passed through the machine the split pulps will be removed and the machine adjusted for the smaller fruit which has been separated from the larger fruit. The smaller fruit will then be run through the machine and split.

To adjust the machine for splitting the smaller fruit, the gate $h$ will be thrown forward to close the notch $f''$ and the stop 17 will be unscrewed to allow the bar 5 to be thrown to the left to the point at which the gates $j$ $j'$ will be thrown to the height required to hold the pit of the fruit on a level with the center of the V edge of the knife $n$. Then the fruits will be passed through the machine in the manner hereinbefore described for the larger fruit.

What I claim, and desire to secure by Letters Patent of the United States, is—

1. A fruit cutter and pitter comprising a fruit-holder adapted and arranged to hold the fruit against the force of gravity; a knife to split the fruit; an expander to follow behind the edge of the knife to expand the split fruit; means for operating the knife and expander horizontally; means for returning the knife and pushing the pit back while the expander is stationary; and means for causing the fruit-holder to allow the cut fruit and pits to fall.

2. A fruit cutter and pitter comprising a fruit-holder adapted and arranged to hold the fruit against the force of gravity; a knife moving in a horizontal path to split the fruit from one side toward the other side; an expander to follow behind the edge of the knife to expand the split fruit; a knife to split the fruit from the other side and to push the fruit-pit back from the expanded pulp in a horizontal path while the expander is stationary; means for operating the knives and expander horizontally; means being arranged to hold the expander stationary while the fruit-pit is being pushed back from the pulp; and means for causing the fruit-holder to allow the cut fruit and pit to fall.

3. A fruit cutter and pitter comprising a fruit-holder adapted and arranged to hold the fruit against the force of gravity; a V-edged knife moving in a horizontal path to split the fruit from one side toward the other; an expander to follow behind the edge of the knife to expand the split fruit and to remain stationary at the close of its forward stroke; a V-edged knife to split the fruit from the other side and to push the fruit-pit back from the expanded pulp while the expander is stationary; means for operating the knives and expander horizontally; means for holding the expander stationary while the fruit-pit is being pushed back; and means for causing the fruit-holder to allow the cut fruit and pit to fall.

4. A fruit cutter and pitter comprising a fruit-holder; a knife to split the fruit from one side toward the other; a fruit-expander comprising an upper pair and a lower pair of superposed pulp-expanding blades, the blades of each pair being arranged on opposite sides of the path of the knife and diverging rearwardly and the edges of the superposed expander-blades diverging forwardly; and means for operating the knife and the expander.

5. A fruit cutter and pitter comprising a fruit-holder; a knife to split the fruit from one side toward the other; a fruit-expander comprising an upper pair and a lower pair of pulp-expanding blades; the blades of each pair being arranged on opposite sides of, and diverging rearwardly from the vertical plane of the path of the knife, and the edges of the superposed blades diverging forwardly from a horizontal plane; a knife to split the fruit from the side opposite the first-named knife; and means for operating the knives and expander.

6. A fruit cutter and pitter comprising a fruit-holder; a knife-carrier; a knife fastened to said carrier and arranged to be moved into and out of the fruit-holder; a pulp-expander carrier arranged to move toward and from the fruit-holder in the path of the knife-carrier; means for moving the knife-carrier to throw the knife into and out of the fruit-holder; yielding means carried by the knife-carrier to receive the forward thrust of the knife-carrier-operating means; and a stop connected with the pulp-expander carrier and mounted behind the knife-carrier-operating means to be actuated thereby to retract the pulp-expander at the close of the rearward movement of the knife.

7. A fruit cutter and pitter comprising a fruit-holder; a knife-carrier; a knife fastened to said carrier and arranged to be moved into and out of the fruit-holder; a pulp-expander carrier arranged to move toward and from the fruit-holder in the path of the knife-carrier; a plunger mounted in ways in the knife-carrier and provided with a shoulder; a spring mounted in the knife-carrier in front of said shoulder to receive the forward thrust of the plunger; means to prevent the plunger from being withdrawn from said ways; a stop connected with the pulp-expander carrier and arranged to be moved backward by the rearward movement of the plunger; a pitman connected with the plunger to move it forward and back to throw the knife and expander into and out of the fruit-holder; and a crank for operating the piston.

8. A fruit cutter and pitter comprising a fruit-holder; a knife-carrier; a knife fastened to said carrier and arranged to be moved into and out of the fruit-holder; a pulp-expander carrier arranged to move toward and from the fruit-holder in the path of the knife-carrier; a plunger mounted in ways in the knife-carrier and provided with a shoulder; a spring mounted in the knife-carrier in front of said shoulder to receive the forward thrust of the plunger; means to prevent the plunger from being withdrawn from said ways; a stop connected with the pulp-expander carrier and arranged to be moved backward by the rearward movement of the plunger; a pitman connected with the plunger to move it forward and back to throw the knife and expander into and out of the fruit-holder; a crank mounted on a shaft and connected with the pitman to operate the same; a knife arranged to move into and out of the fruit-holder in the extended path of said fruit-splitting knife; and means connected with said crank-shaft for operating said knife.

9. The combination of a fruit-holder; a knife-carrier; a knife projecting forward from said carrier; means for reciprocating the carrier for throwing the knife into and out of the fruit-holder; a pivoted knife arranged to move into and out of the fruit-holder in the extended path of said first-named knife; a wrist-pin connected with the knife-carrier to reciprocate the same; a pitman connected with said wrist-pin; a crank connected with said pitman; means connected with the crank for throwing the pivoted knife into the fruit-holder; and means for retracting the pivoted knife from the fruit-holder.

10. The combination of a fruit-holder; a knife-carrier; a knife projecting forward from said carrier; means for reciprocating the carrier for throwing the knife into and out of the fruit-holder; a pulp-expander carrier furnished with pulp-expanders and arranged to move toward and from the fruit-holder in the path of the knife-carrier and to be actuated by the knife-carrier; a pitman connected with the knife-carrier to reciprocate the same; a crank connected with the pitman to operate the same; a pivoted knife arranged to move into and out of the fruit-holder in the extended path of said first-named knife; a cam-shaft operatively connected with the crank to be rotated thereby and provided with a cam to throw the pivoted knife into the fruit-holder to split the pulp opposite the split made by the first-named knife.

11. In a fruit cutter and pitter, a fruit-holder comprising a chute which forms the sides of the holder; two gates pivoted at opposite sides of the chute below the top thereof to form the bottom of the holder; means for simultaneously extending said gates toward each other a part of the way across said chute; means for feeding fruit into the top of the chute; and means for simultaneously retracting the gates.

12. In a fruit cutter and pitter, the combination of a chute; two gates consisting in bent wires pivoted at opposite sides of the chute; two arms, one for each of said gates and oppositely arranged relatively to said gates; and a bar connected with said arms to simultaneously operate them to move the gates, the arms of the two gates being bent vertically in opposite directions and being connected with the operating-bar above and below their respective journals.

13. In a fruit cutter and pitter, the combination of a chute with openings at its opposite sides; a reciprocating knife arranged upon one side of the chute to play through one of said openings; a reciprocating pulp-expander to follow the edge of said knife and to be reciprocated into and out of said opening in said chute; a reciprocating knife on the other side of the chute arranged to play through the opening in said other side; two gates pivoted at the sides of the chute; means for reciprocating the knives and expander; means operatively connected therewith to move said gates toward each other to sustain the fruit in the chute while the knives and expander are advancing and to withdraw the gates from said chute after the knives and expander have been retracted.

14. In a fruit cutter and pitter, the combination with a chute having openings at its opposite sides; of a reciprocating knife arranged upon one side of the chute to play through one of said openings; a reciprocating pulp-expander to follow the edge of said knife and to be reciprocated into and out of said opening in said chute; a reciprocating knife on the other side of the chute arranged to play through the opening in said other side; two gates pivoted at the sides of the chute; means for reciprocating the knives and expander; arms connected with said gates respectively, one projecting upward and the other downward from the axis of its respective gate; a reciprocating bar for simultaneously operating the said arms to throw said gates across and retract them from said chute; means for holding the bar normally in position to throw the gates across the chute; a lug connected with said bar; and a reciprocating pivoted trip operatively connected with said first-named reciprocating knife and arranged to engage said lug at the retracting movement of said knife to withdraw said bar from its normal position, thereby to withdraw the gates from said chute.

15. In a fruit cutter and pitter, the combination of a chute; two gates pivoted to partially close the chute and arranged to be withdrawn from said chute; a reciprocating knife arranged to play into and out of said chute; an expander to follow the edge of the knife to expand the pulp of the fruit; a pivoted knife arranged to reciprocate into and out of the chute from the other side; a pitman operatively connected with the first-mentioned knife to operate the same; means for operating the expander; a crank for operating said pitman; a shaft furnished with a cam and operatively connected with the crank to throw the pivoted knife into the chute in the extended path of the first-named reciprocating knife; gates pivoted respectively at the opposite side of the chute and arranged to extend partially across the chute to close the same; arms connected with the gates respectively and extending in opposite directions on the different gates; a reciprocating bar arranged to operatively engage the said arms; a lug on said bar; means for normally holding the bar in position with the gates across the chute; and a pivoted latch operatively connected with the first-named knives to retract said bar on the return movement of said knives.

16. In a fruit cutter and pitter, the combination with a pivoted knife; a cam for throwing said knife to cut the fruit; a latch pivotally connected with said knife; and means to move with the cam to catch said latch to retract the knife at the return movement of the cam.

17. In a fruit cutter and pitter, the combination of a driving-shaft; a cog-wheel on said driving-shaft; a cam-shaft; a cog-wheel on the cam-shaft geared with the cog-wheel of the driving-shaft; a pivoted knife; a cam on the cam-shaft to throw the pivoted knife to split the fruit; a latch pivotally connected with the pivoted knife; a catch carried by the cam-shaft to catch the latch; said latch extending to normally rest upon the driving-shaft; and an arm on the driving-shaft to lift the latch from the catch after the knife has been retracted.

18. The combination of fruit-cutting mechanism; a fruit-holder for holding the fruit to be operated on by such mechanism; a roller provided with fingers to feed fruit to the fruit-holder; a chute to carry fruit to the roller and provided with notches to allow the fingers to pass; and operative means for synchronously operating the roller and the fruit cutting and pitting mechanism.

19. The combination of a feed-roller furnished with fingers; a chute leading to said feed-roller and provided in its floor with notches at the roller to allow the fingers to pass; a holder arranged to receive the fruit from said fingers when the roller is rotated; V-shaped splitting-knives arranged to reciprocate into and out of said holder; means for holding the fruit in said holder and releasing it therefrom; pivoted knives to reciprocate into and from the holder in the extended path of the first-mentioned knives; a crank-shaft; a pitman connected with the crank-shaft to operate the said first-mentioned knives; a cog-wheel on the crank-shaft; a cog-wheel meshing with such cog-wheel and mounted on a cam-shaft; such cam-shaft provided with a cam for operating the second-mentioned knives; a sprocket-wheel on the crank-shaft; a cog-wheel on the roller; a pinion meshing with said cog-wheel; a sprocket-wheel to drive said pinion; and a sprocket-chain connecting said sprocket-wheels together.

In testimony whereof I have signed my name to this specification, in the presence of two subscribing witnesses, at Los Angeles, California, this 17th day of May, 1900.

J. W. FAWKES, Sr.

Witnesses:
    JAMES R. TOWNSEND,
    JULIA TOWNSEND.